United States Patent
Kim et al.

(10) Patent No.: US 9,227,672 B2
(45) Date of Patent: Jan. 5, 2016

(54) COMPOSITE VEHICLE BODY AND MANUFACTURING METHOD THEREOF AND VEHICLE BODY STRUCTURE USING THE SAME

(71) Applicant: Hyundai Motor Company, Seoul (KR)

(72) Inventors: Dae Seung Kim, Gwacheon-si (KR); Heui Won Yang, Suwon-si (KR); Seongwook Seo, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 42 days.

(21) Appl. No.: 14/100,826

(22) Filed: Dec. 9, 2013

(65) Prior Publication Data

US 2014/0159425 A1    Jun. 12, 2014

(30) Foreign Application Priority Data

Dec. 11, 2012 (KR) .......................... 10-2012-0143880

(51) Int. Cl.
*B62D 25/06* (2006.01)
*B62D 29/00* (2006.01)
(Continued)

(52) U.S. Cl.
CPC ........ *B62D 29/005* (2013.01); *B29C 45/14344* (2013.01); *B29C 70/72* (2013.01); *B62D 25/06* (2013.01); *B62D 29/004* (2013.01); *B62D 29/048* (2013.01); *Y10T 29/49622* (2015.01)

(58) Field of Classification Search
CPC .... B21D 17/02; B21D 53/88; B29C 45/0005; B29C 45/14; B29C 45/14065; B29C 45/1418; B29C 45/14196; B29C 45/14237; B29C 45/14245; B29C 45/14344; B29C 45/14368; B29C 45/14467; B29C 45/14508; B29C 45/1463; B29C 65/3456; B29C 65/3656; B29C 66/721; B29C 66/723; B29C 66/7321; B29C 66/74; B29C 66/742; B29C 70/02; B29C 70/021; B29C 70/023; B29C 70/026; B29C 70/68; B29C 70/682; B29C 70/683; B29C 70/685; B29C 70/72; B29C 2045/0067; B29C 2045/14516; B29C 2045/14967; B29C 2945/76294; B29C 2945/76772; B32B 1/04; B32B 3/266; B32B 2305/08; B32B 2305/34; B62D 25/06; B62D 29/001; B62D 29/002; B62D 29/004; B62D 29/007; B62D 29/04; B62D 29/048; B62D 65/02

See application file for complete search history.

(56) References Cited

U.S. PATENT DOCUMENTS 3,850,474 A * 11/1974 Welch .......................... 296/181.2
4,516,804 A *  5/1985 Yamawaki et al. ........... 296/214
(Continued)

FOREIGN PATENT DOCUMENTS

DE    102006027765 A1 * 12/2007 ............. B62D 25/00
DE    102009008662 A1 *  8/2010 ........... B62D 27/065
(Continued)

*Primary Examiner* — Glenn Dayoan
*Assistant Examiner* — Paul Chenevert
(74) *Attorney, Agent, or Firm* — McDermott Will & Emery LLP

(57) ABSTRACT

A composite vehicle body panel includes a fiber reinforced plastic panel and a steel flange disposed in the fiber reinforced plastic panel and having an edge protruding outward from the fiber reinforced plastic panel beyond an outer edge of the fiber reinforced plastic panel. The composite vehicle body panel can be used in vehicle structures manufactured on standard vehicle productions lines, thereby easing vehicle manufacturing, improving productivity, and providing increased rigidity to the vehicle bodies. A method of manufacturing the composite vehicle body panel and a vehicle structure using the panel are also provided.

10 Claims, 12 Drawing Sheets

(51) Int. Cl.
  *B29C 70/72* (2006.01)
  *B29C 45/14* (2006.01)
  *B62D 29/04* (2006.01)

(56) References Cited

U.S. PATENT DOCUMENTS

| | | | | |
|---|---|---|---|---|
| 4,573,707 | A * | 3/1986 | Pabst | 280/792 |
| 4,791,765 | A * | 12/1988 | Noggle | 52/309.2 |
| 4,976,490 | A * | 12/1990 | Gentle | 296/183.1 |
| 5,137,674 | A * | 8/1992 | Braconier | 264/161 |
| 5,160,772 | A * | 11/1992 | Futami et al. | 428/71 |
| 5,704,178 | A * | 1/1998 | Ciao | 52/309.1 |
| 6,073,991 | A * | 6/2000 | Naert | 296/187.02 |
| 6,113,832 | A * | 9/2000 | Tanaka et al. | 264/279 |
| 6,276,748 | B1 * | 8/2001 | Gobessi et al. | 296/190.02 |
| 6,315,326 | B1 * | 11/2001 | Muller et al. | 280/756 |
| 6,347,829 | B1 * | 2/2002 | Hanyu | 296/210 |
| 6,564,525 | B1 * | 5/2003 | Staser | 296/146.5 |
| 2002/0069938 | A1 * | 6/2002 | Hanakawa et al. | 148/212 |
| 2002/0140253 | A1 * | 10/2002 | Lumpe et al. | 296/210 |
| 2002/0168499 | A1 * | 11/2002 | Goldbach et al. | 428/139 |
| 2002/0174620 | A1 * | 11/2002 | Binnebose et al. | 52/698 |
| 2003/0011213 | A1 * | 1/2003 | Zinsmeister et al. | 296/210 |
| 2004/0072006 | A1 * | 4/2004 | Staargaard et al. | 428/544 |
| 2004/0094992 | A1 * | 5/2004 | Bohm et al. | 296/210 |
| 2004/0197534 | A1 * | 10/2004 | Miller et al. | 428/195.1 |
| 2005/0175400 | A1 * | 8/2005 | Behr et al. | 403/267 |
| 2005/0212333 | A1 * | 9/2005 | Mally et al. | 296/203.03 |
| 2005/0224164 | A1 * | 10/2005 | Chu | 156/230 |
| 2005/0278935 | A1 * | 12/2005 | Hord | 29/527.2 |
| 2006/0065481 | A1 * | 3/2006 | Connelly | 181/290 |
| 2007/0262486 | A1 * | 11/2007 | Waters et al. | 264/220 |
| 2007/0267899 | A1 * | 11/2007 | Guicheteau | 296/215 |
| 2008/0138586 | A1 * | 6/2008 | Mooijman et al. | 428/179 |
| 2008/0317988 | A1 * | 12/2008 | Mooijman et al. | 428/36.9 |
| 2011/0057476 | A1 * | 3/2011 | Beck et al. | 296/181.2 |
| 2012/0061998 | A1 * | 3/2012 | Carsley et al. | 296/210 |
| 2014/0062144 | A1 * | 3/2014 | Park et al. | 296/210 |
| 2015/0034409 | A1 * | 2/2015 | Leibl | 180/312 |
| 2015/0145289 | A1 * | 5/2015 | Inaba | B32B 17/10 296/210 |
| 2015/0183183 | A1 * | 7/2015 | Takano | B29C 65/48 428/178 |

FOREIGN PATENT DOCUMENTS

| | | | | |
|---|---|---|---|---|
| FR | WO 2014102509 A1 * | 7/2014 | | B29C 70/72 |
| JP | 06-011903 Y | 3/1994 | | |
| JP | 2006-069374 A | 3/2006 | | |
| KR | 10-1998-0048239 A | 9/1998 | | |
| KR | 10-2007-0114142 A | 11/2007 | | |

* cited by examiner

COMPOSITE VEHICLE BODY AND MANUFACTURING METHOD THEREOF AND VEHICLE BODY STRUCTURE USING THE SAME

CROSS-REFERENCE TO RELATED APPLICATION

This application claims priority to and the benefit of Korean Patent Application No. 10-2012-0143880 filed in the Korean Intellectual Property Office on Dec. 11, 2012, the entire contents of which are incorporated herein by reference.

TECHNICAL FIELD

The present disclosure relates to a composite vehicle body panel, a manufacturing method thereof, and a vehicle body structure using the same. More particularly, the present disclosure relates to a composite vehicle body panel made of fiber reinforced plastic and steel, a method of manufacturing the composite vehicle body panel, and a vehicle body structure using the composite vehicle body panel.

BACKGROUND

Panels made of steel have generally been used as body panels of vehicles. Recently, however, Fiber Reinforced Plastic (FRP) is being used for making vehicle body panels having reduced weight.

Referring to FIGS. 1 and 2, a fiber reinforced plastic panel 10 is used as a roof panel. The fiber reinforced plastic panel 10, however, cannot be attached to a side steel vehicle body 20 by welding, such as spot welding or arc welding, and therefore must be attached by other mechanical fastening methods.

That is, the fiber reinforced plastic panel 10 and the side steel vehicle body 20 are attached to each other by forming fastening holes at the flange of the side steel vehicle body 20 and at the flange of the fiber reinforced plastic panel 10, which are supposed to be attached. The fiber reinforced plastic panel 10 is then arranged such that the flange of the panel 10 is on top of the flange of the side steel vehicle body 20. The flanges are then bonded with an adhesive 30, and then by inserting a rivet through the fastening holes, as shown in FIG. 2.

Because vehicle bodies are generally assembled by welding on current vehicle manufacturing lines, the cost for manufacturing vehicle bodies requiring other assembly methods may increase manufacturing costs. For example, when a fiber reinforced plastic panel 10 and a side steel vehicle body 20 are attached together using mechanical methods such as the method described above, additional process steps for forming the fastening holes and applying and hardening the adhesive are required. The addition of such process steps increases the cost for manufacturing vehicle bodies.

Further, the forming of a fastening hole in the fiber reinforced plastic panel 10 commonly causes delamination of the fiber reinforced plastic. In order to avoid such defects, the size of the fastening hole may need to be increased and/or the time allotted for forming the fastening hole may need to be increased.

Further, the bonding strength provided by attaching the fiber reinforced plastic panel 10 to the side steel panel 20 with bolts and nuts is small in comparison with the strength provided by spot welding of the same diameter. Therefore, more attachment points (each including a bolt and nut) are required to fasten the fiber reinforced plastic panel 10 to the side steel panel 20 with bolts and nuts, as compared to when fastening methods using welding are used.

The above information disclosed in this Background section is only for enhancement of understanding of the background of the disclosure and therefore it may contain information that is not prior art in this country to a person of ordinary skill in the art.

SUMMARY

The present disclosure has been made in an effort to provide a composite vehicle body panel that can be fastened to other portions of a vehicle body by welding, and to provide a manufacturing method thereof, and a vehicle body structure using the same.

An exemplary embodiment of the present disclosure provides a composite vehicle body panel, which may include: a fiber reinforced plastic panel; and a steel flange disposed in the fiber reinforced plastic panel and having an edge protruding outward from the fiber reinforced plastic panel beyond an outer edge of the fiber reinforced plastic panel.

The steel flange may have one or more fastening holes extending through the steel flange and filled by the fiber reinforced plastic panel.

The steel flange may have a stepped portion formed at an angle along an outer edge of the steel flange to cause the outer edge of the steel flange to be stepped in the height direction with respect to a central portion of the steel flange.

The steel flange may have one or more foaming portions formed as receiving grooves in the steel flange.

A foamed plastic may be bonded to each foaming portion.

The steel flange may have one or more through-holes and a foaming portion may be formed along the edge of each of the through-holes.

The steel flange may further have one or more foaming portions formed at edges of the steel flange and that extend across the steel flange in a width direction.

Separation walls comprising continuous pieces of steel that extend across substantially the whole width of the steel flange can be disposed between the through-holes, and fastening holes may be disposed in the separation walls.

Another exemplary embodiment of the present disclosure provides a method of manufacturing a composite vehicle body panel, which may include: manufacturing a steel panel; forming foaming portions and a stepped portion on the steel panel using a press; forming a steel flange with one or more fastening holes and one or more through-holes by punching the steel panel; manufacturing a foamed plastic in a shape that can be inserted into the foaming portions; inserting and bonding the foamed plastic into foaming portions; manufacturing a fiber reinforced plastic panel; and inserting the steel flange into a mold, mounting the fiber reinforced plastic panel onto the steel flange, and applying heat and pressure to form the composite vehicle body panel.

The steel flange may have an edge protruding outward from the fiber reinforced plastic panel beyond an outer edge of the fiber reinforced plastic panel.

The foaming portion may be formed as a receiving groove in the steel panel.

The stepped portion may be formed at an angle along an outer edge of the steel plate to cause the outer edge of the steel plate to be stepped in the height direction with respect to a central portion of the steel plate.

The steel panel may be a surface-treated steel plate and the fiber reinforced plastic panel is a fiber reinforced plastic panel using carbon fiber.

Yet another exemplary embodiment of the present disclosure provides a method of manufacturing a composite vehicle body panel, which may include: manufacturing a steel panel;

forming foaming portions and a stepped portion on the steel panel using a press; forming a steel flange with one or more fastening holes and one or more through-holes by punching the steel panel; manufacturing a foamed plastic in a shape that can be inserted into the foaming portions; inserting and bonding the foamed plastic into the foaming portions; and spraying and hardening discontinuous fiber and resin on the steel flange.

Another exemplary embodiment of the present disclosure provides a vehicle body structure including a vehicle side body panel and a composite vehicle body panel that is welded to an upper edge of the vehicle side body panel to function as a roof panel.

According to a composite vehicle body panel, a manufacturing method thereof, and a vehicle by structure using the same of an exemplary embodiment of the present disclosure, a steel flange made of steel is disposed in and integrally combined with a fiber reinforced plastic panel, thereby forming a composite vehicle body panel.

Therefore, since the steel flange of the composite vehicle body panel can be welded to other portions of a vehicle body, assembly productivity of the vehicle body can be improved and the weight and cost can be reduced.

It is possible to appropriately carry transverse load on the composite vehicle body panel by forming foaming portions on the steel flange and forming a step along edges of the steel flange and disposing the steel flange within the fiber reinforced plastic. It is possible to suppress delamination of the fiber reinforced plastic and appropriately carry vertical load by forming holes in the steel flange and filling the holes with the fiber reinforced plastic. The composite vehicle body panel has the increased strength because of the combined strengths of the steel flange and of the fiber reinforced plastic.

By welding the composite vehicle body panel to a side vehicle body made of steel, load is appropriately transmitted and distributed when the vehicle is hit on the side or rolls over. The safety of passengers of the vehicle is thereby improved.

When the composite vehicle body panel is formed by combining a steel flange with a CFRP using carbon fiber and a surface-treated steel sheet, it is possible to prevent galvanic corrosion between the carbon fiber and the steel.

DETAILED DESCRIPTION

Exemplary embodiments of the present disclosure will be described hereafter in detail with reference to the accompanying drawings.

Figure 1:
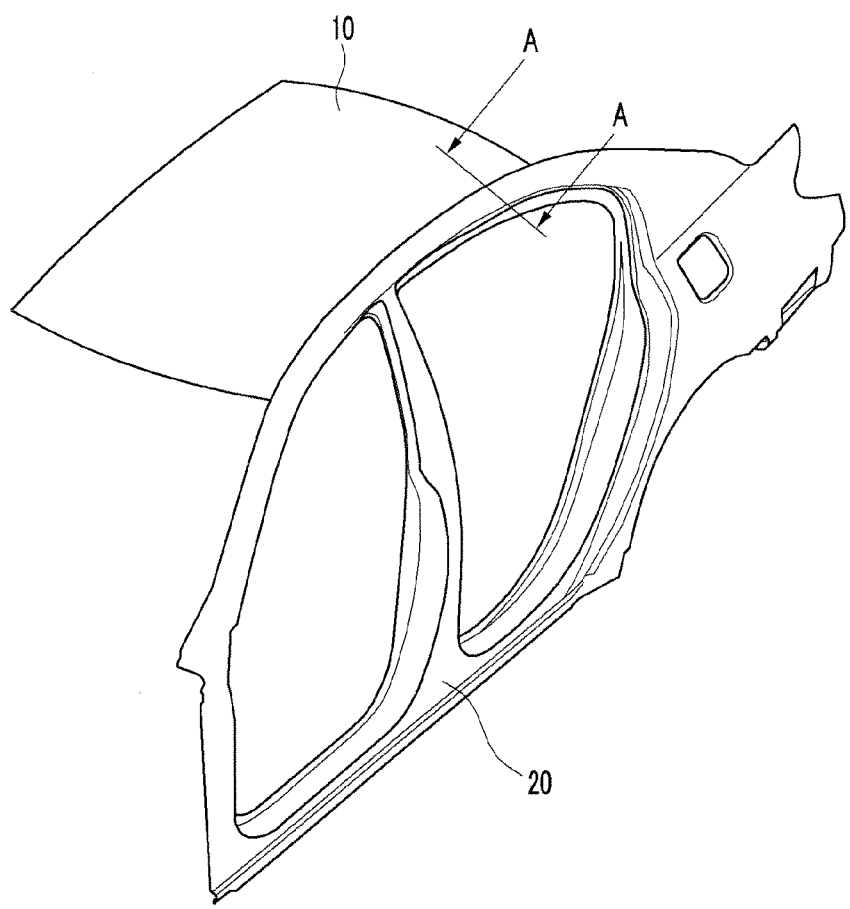
FIG. 1 is a perspective view showing a common vehicle body including a fiber reinforced plastic panel used as a vehicle body panel according to the prior art.
Figure 2:
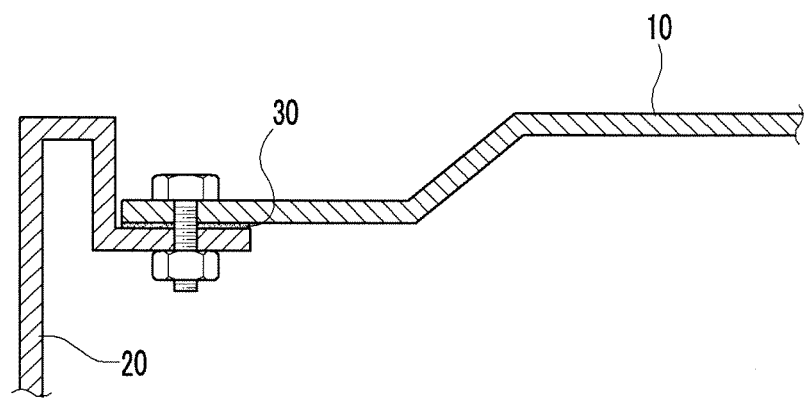
FIG. 2 is a cross-sectional view taken along line A-A in FIG. 1 according to the prior art.
Figure 3:
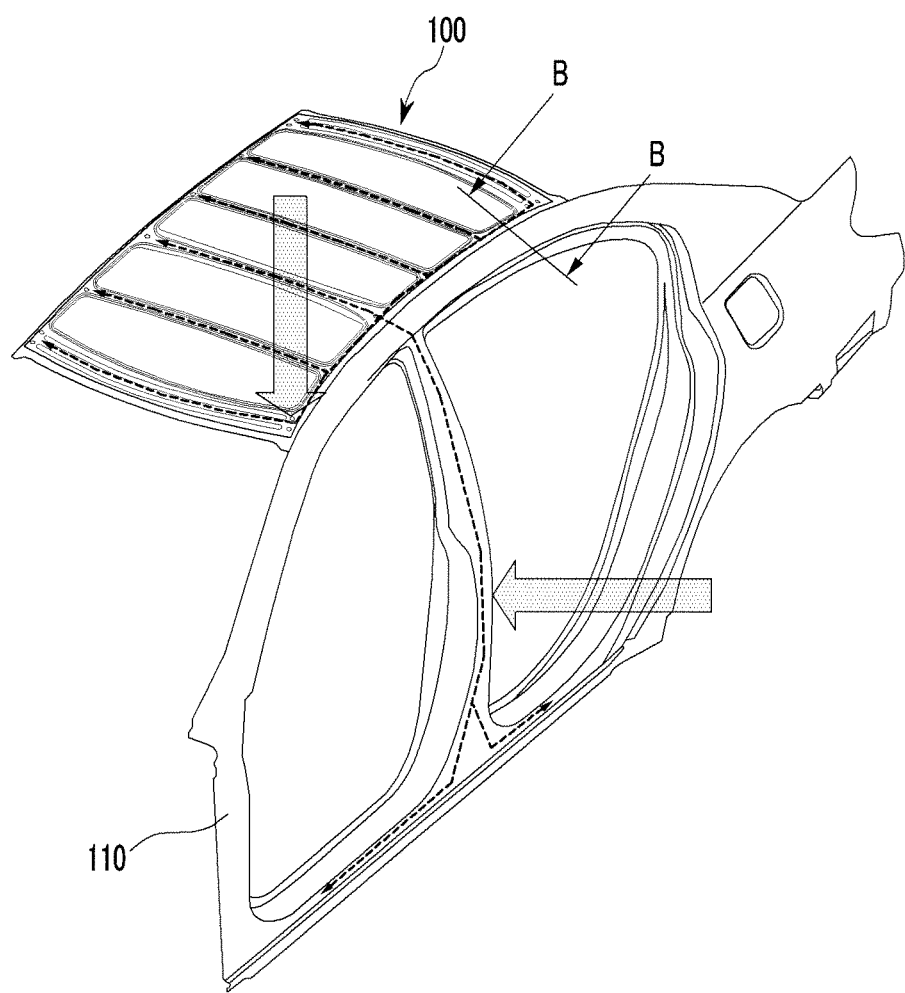
FIG. 3 is a perspective view showing a vehicle body including a composite vehicle body panel, according to an exemplary embodiment of the present disclosure.
Figure 4:
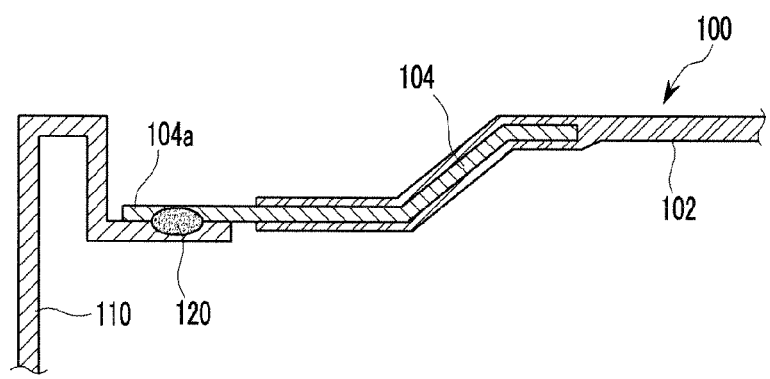
FIG. 4 is a cross-sectional view taken along line B-B in FIG. 3.

Referring to FIGS. 3 and 4, a composite vehicle body panel 100 according to an exemplary embodiment of the present disclosure is used as a roof panel and welded to the upper edge of a vehicle side body 110 made of steel, thereby forming a portion of a vehicle body.

The composite vehicle body panel 100 may, more generally, be used as a vehicle body panel other than a roof panel.

The composite vehicle body panel 100 includes a fiber reinforced plastic panel 102 and a steel flange 104. The composite vehicle body panel 100 is assembled by forming the fiber reinforced plastic panel 102 around the steel flange 104.

The steel flange 104 is larger in width and length than the fiber reinforced plastic panel 102. As such, an outer edge 104a of the steel flange 104 protrudes outward beyond an outer edge of the fiber reinforced plastic panel 102 when the steel flange 104 and the fiber reinforced plastic panel 102 are assembled.

During assembly of the vehicle body, the outer edge 104a of the steel flange 104 is placed on the side vehicle body 110 and then fastened thereto by welding 120 such as spot welding or arc welding.

Therefore, joint stiffness of the joint between the composite vehicle body panel 100 and the side vehicle body 110 is improved, and it is not required to add a specific combination process in the assembly line of vehicles.

When a vehicle having a vehicle body including a composite vehicle body panel 100 such as the one described above is hit on the side or rolls over, load applied to the composite vehicle body panel 100 is appropriately transmitted and distributed to the side vehicle body 110 through the steel flange 104. Because of the transmitting and distributing of the load, safety of passengers in the vehicle is improved as compared to vehicles in which the body structure only uses a fiber reinforced plastic panel.

Referring to FIGS. 5 through 10, the composite vehicle body panel 100 according to an exemplary embodiment of the present disclosure can be manufactured through the following steps.

Figure 5:
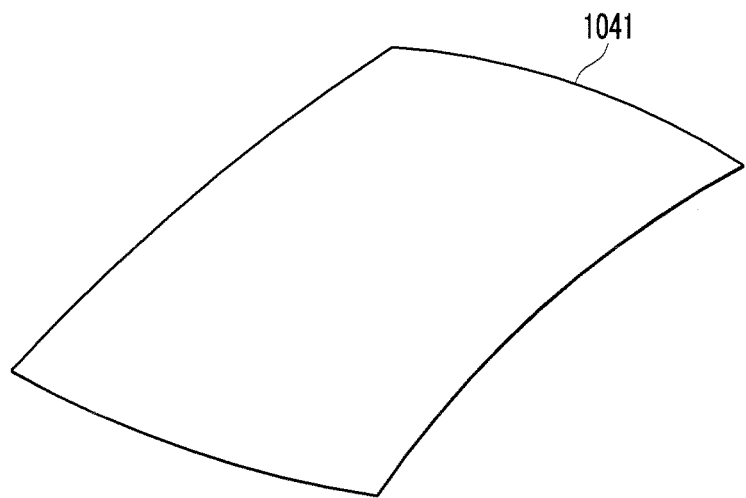
FIG. 5 is a perspective view showing a steel panel for manufacturing a composite vehicle body panel according to an exemplary embodiment of the present disclosure.

As shown in FIG. 5, a steel panel 1041 made of steel or a surface-treated steel panel is manufactured in a substantially rectangular shape and structure.

In the surface-treated steel panel, for example, when a zinc-fusing alloy steel plate is used as the steel panel and the composite vehicle body panel 100 is made of CFRP (Carbon-fiber-reinforced plastic), it is possible to suppress corrosion (galvanic corrosion) due to a potential difference between the carbon fiber and the steel.

Figure 6:
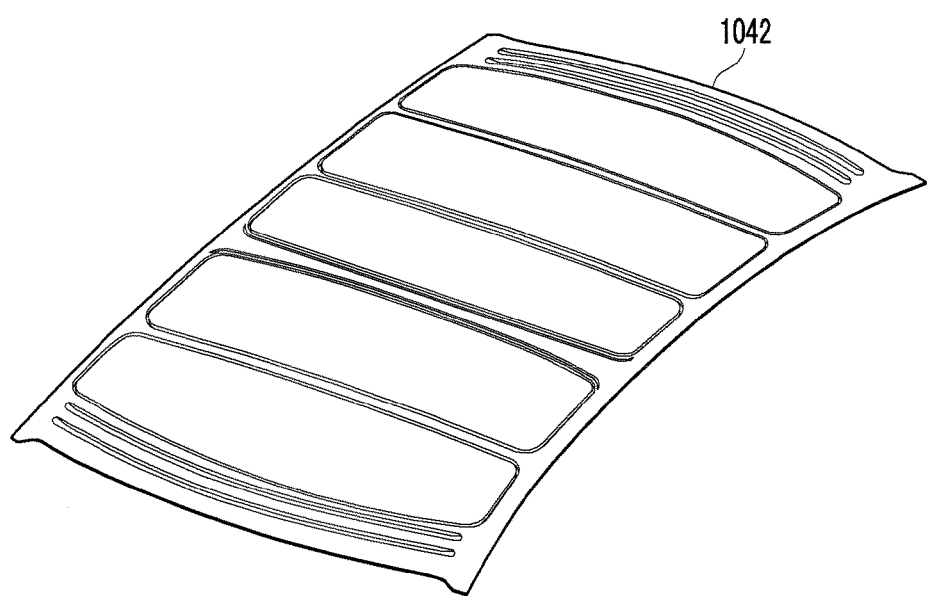
FIG. 6 is a perspective view showing a steel panel shaped by a press and used to manufacture a composite vehicle body panel according to an exemplary embodiment of the present disclosure.
Figure 11:
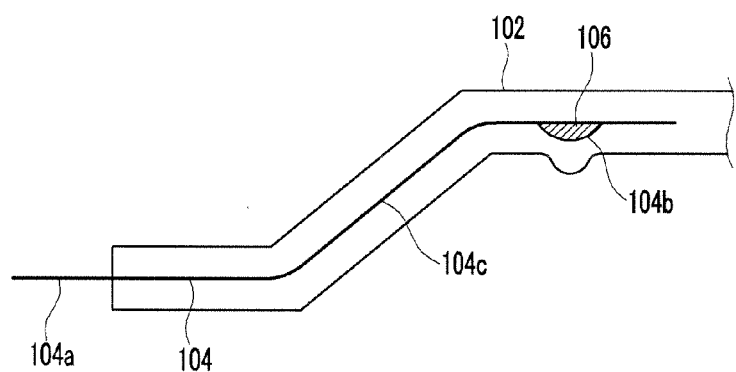
FIG. 11 is a cross-sectional view taken along line C-C in FIG. 10.

As shown in FIG. 6, a formed steel panel 1042 is manufactured by shaping the steel panel 1041 with a press. The formed steel panel 1042 can be formed to have a foaming portion 104b and a stepped portion 104c, as shown in FIG. 11, when the steel panel 1041 is shaped by the press. The foaming portion 104b and stepped portion 104c may increase joint stiffness with the fiber reinforced plastic panel 110.

The foaming portion 104b serves to appropriately carry transverse load that is applied to the composite vehicle body panel 100. The stepped portion 104c serves to suppress lateral slippage such that slippage does not occur between the steel flange 104 and the fiber reinforced plastic panel 102 when transverse load is applied to the composite vehicle body panel 100.

The foaming portion 104b can be implemented by forming a receiving groove in the steel flange 104, the receiving groove having a downward concave shape.

The stepped portion 104c is formed at an angle along an outer edge of the steel flange 104 to cause the outer edge of the steel flange to be stepped in the height direction with respect to a central portion of the steel flange.

Figure 7:
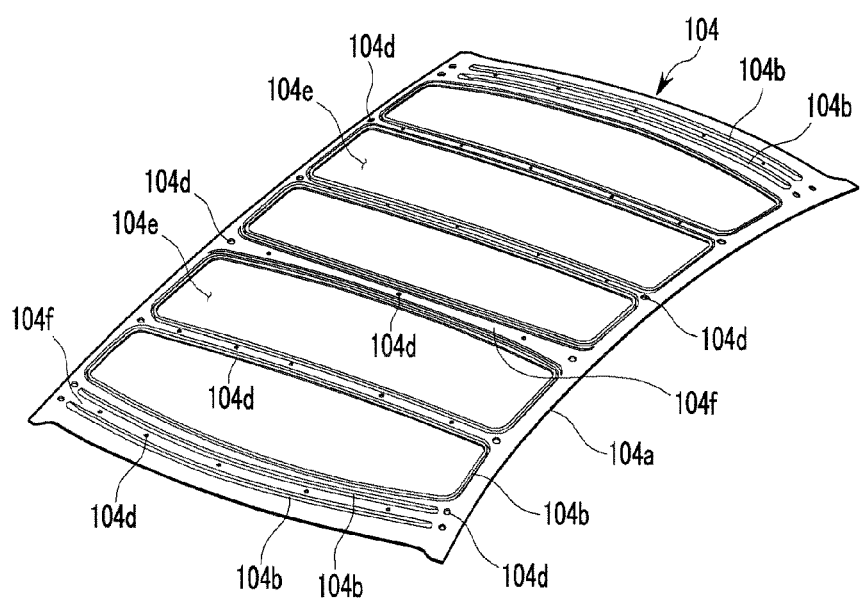
FIG. 7 is a perspective view showing a steel flange according to an exemplary embodiment of the present disclosure.

As shown in FIG. 7, the steel flange 104 is completed by punching the formed steel panel 1042 with a trim mold.

One or more fastening holes 104d are formed at positions located along outer edges 104a of the steel flange 104, when the formed steel panel 1042 is punched by the trim mold. The fastening holes 104d are formed at predetermined intervals along the outer edges 104a.

Figure 12:
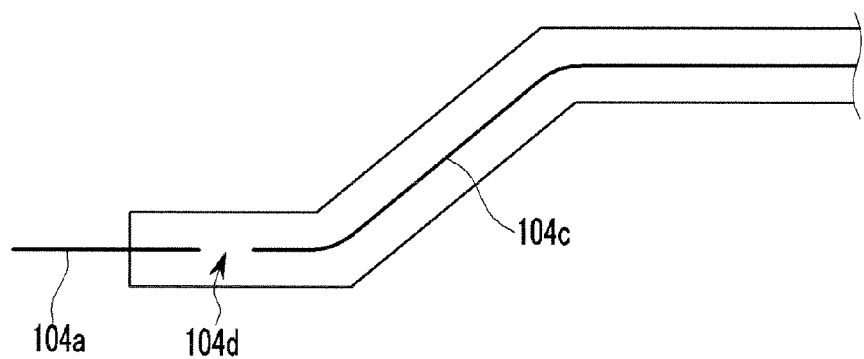
FIG. 12 is a cross-sectional view taken along line D-D in FIG. 10.

By filling each fastening hole 104d with fiber reinforced plastic resin, as shown in FIG. 12, it is possible to increase the joint stiffness between the steel flange 104 and the fiber reinforced plastic panel 102, to prevent delamination of the fiber reinforced plastic due to vertical load, and to reduce the manufacturing time by making resin injection smooth when manufacturing the fiber reinforced plastic panel 102, using a carbon fiber sheet.

The formed steel flange 104 is formed in the shape of a substantially rectangular panel with one or more through-holes 104e divided by separation walls 104f, at predetermined intervals. The separation walls 104f are continuous pieces of steel that extend across substantially the whole width of the steel flange 104 between stepped portions 104c formed on both sides of the steel flange 104 (i.e., between stepped portions 104c that are positioned on both sides of the vehicle body).

The foaming portion 104b is continuously formed along the edge of each of the through-holes 104e. In addition, one or more foaming portions 104b are formed at the edges of both ends of the steel flange 104 and extend in the width direction across the steel flange 104. The forming portions 104b are formed at edges of the steel flange 104 that are positioned towards the front and towards the rear of the vehicle body, and extend across substantially the whole width of the steel flange 104 between stepped portions 104c formed on both sides of the steel flange 104.

One or more fastening holes 104d may be formed on each of the separation walls 104f and may be formed at both left and right extremities of the foaming portions 104b that extend across substantially the whole width of the steel flange 104.

The position and the number of the fastening holes 104d may be appropriately selected and set to provide strength and reliability in the connection between the steel flange 104 and the fiber reinforced plastic panel 102.

Figure 8:
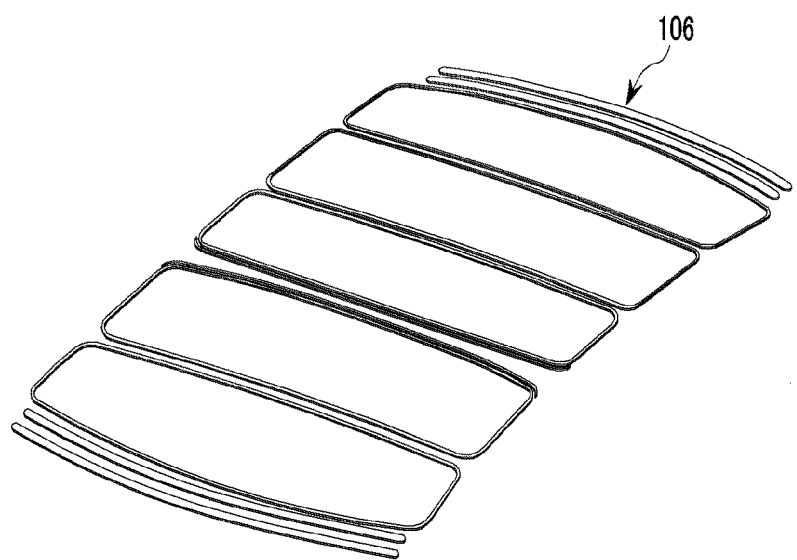
FIG. 8 is a perspective view showing foamed plastic for use in manufacturing a composite vehicle body panel according to an exemplary embodiment of the present disclosure.
Figure 9:
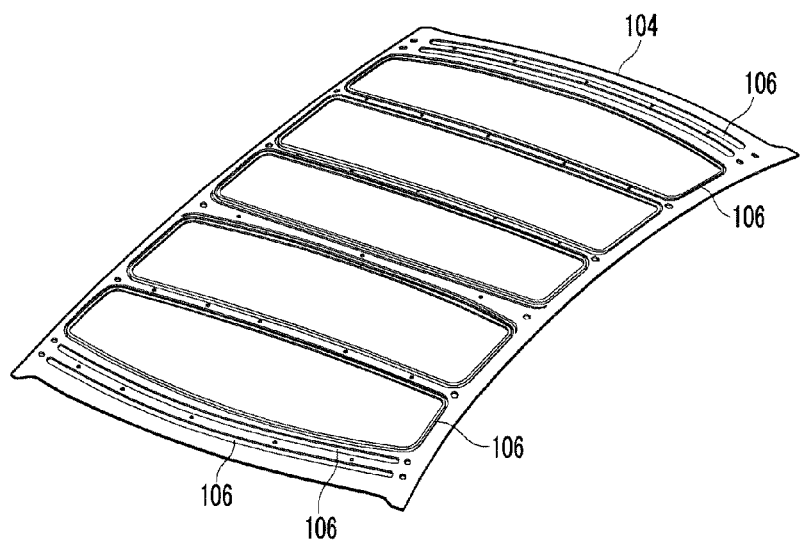
FIG. 9 is a perspective view showing the foamed plastic disposed on the steel flange to manufacture a composite vehicle body panel according to an exemplary embodiment of the present disclosure.

As shown in FIG. 8, foamed plastics 106 are formed to fill the foaming portions 104b. The foamed plastics 106 are inserted and bonded in the foaming portions 104b, as shown in FIG. 9.

The foamed plastics 106 can improve the quality of the external appearance, increase rigidity, and reduce the amount of material used in forming the fiber reinforced plastic panel 102, when the foaming portions 104b of the steel flange 104 are covered with the fiber reinforced plastic panel 102.

Figure 10:
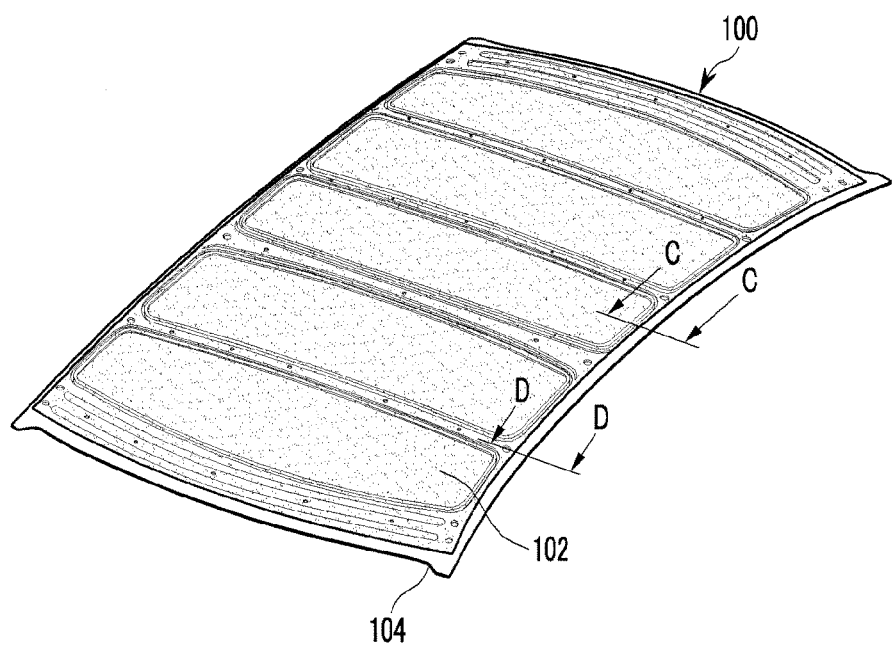
FIG. 10 is a perspective view showing a composite vehicle body panel according to an exemplary embodiment of the present disclosure.

The composite vehicle body panel 100 is formed, as shown in FIG. 10, by forming the fiber reinforced plastic panel 102 onto the steel flange 104. A steel flange formed as described above, and having foamed plastics attached thereto, is inserted in a mold used for forming the fiber reinforced plastic panel 102. That is, the forming is performed by inserting a steel flange 104 into a mold, mounting fiber reinforced plastic onto the top and the bottom of the steel flange 104, and applying heat and pressure thereto.

The composite vehicle body panel 100 can be manufactured by inserting and setting a steel flange 104 in a mold, putting a BMC (Bulk Molding Compound) made by mixing discontinuous fiber with resin into the mold, and applying heat and pressure. Alternatively, the composite vehicle body panel 100 can be manufactured using an RTM (Resin Transfer Molding) method of covering a steel flange 104 with an SMC (Sheet Molding Compound) or a carbon fiber sheet, injecting resin into a mold, and applying heat and pressure. The composite vehicle body panel 100 can further be manufactured by spraying discontinuous fiber and resin onto a steel flange 104 and hardening them.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

100: Composite vehicle body panel
102: Fiber reinforced plastic panel
104: Steel flange
106: Foamed plastic
120: Welding

What is claimed is:

1. A composite vehicle body panel comprising:
a fiber reinforced plastic panel; and
a steel flange disposed in the fiber reinforced plastic panel and having an outer edge protruding outward from the fiber reinforced plastic panel beyond an outer edge of the fiber reinforced plastic panel,
wherein the steel flange has one or more foaming portions formed as receiving grooves in the steel flange at edges of the steel flange and extending across the steel flange in a width direction,
the steel flange has one or more through-holes along each of which a foaming portion is formed, and
the steel flange includes at least one separation wall, which is formed of steel and extends across the whole width of the steel flange, disposed between the one or more through-holes, and having one or more fastening holes formed therein.

2. The composite vehicle body panel of claim 1, wherein the one or more fastening holes filled by the fiber reinforced plastic panel.

3. The composite vehicle body panel of claim 1, wherein the steel flange has a stepped portion formed at an angle along the outer edge thereof so that the outer edge of the steel flange is stepped in a height direction with respect to a central portion of the steel flange.

4. The composite vehicle body panel of claim 1, wherein a foamed plastic is bonded to each foaming portion.

5. A vehicle body structure comprising:
a vehicle side body panel; and
the composite vehicle body panel of claim 1 welded to an upper edge of the vehicle side body panel to function as a roof panel.

6. A method of manufacturing a composite vehicle body panel, the method comprising:
manufacturing a steel panel;
forming foaming portions and a stepped portion on the steel panel by pressing;
forming a steel flange with one or more fastening holes and one or more through-holes by punching the steel panel;
manufacturing a foamed plastic in a shape that can be inserted into the foaming portions;
inserting and bonding the foamed plastic into the foaming portions;
manufacturing a fiber reinforced plastic panel; and
inserting the steel flange into a mold, mounting the fiber reinforced plastic panel onto the steel flange, and applying heat and pressure to form the composite vehicle body panel,
wherein the foaming portions are formed as receiving grooves in the steel flange at edges of the steel flange and extend across the steel flange in a width direction,
each of the one or more through-holes has a foaming portion along the edge thereof, and
the steel flange includes at least one separation wall in which the one more fastening holes are formed, the at least separation wall formed of steel, extending across the whole width of the steel flange, and disposed between the one or more through-holes.

7. The method of claim 6, wherein the steel flange has an outer edge protruding outward from the fiber reinforced plastic panel beyond an outer edge of the fiber reinforced plastic panel.

8. The method of claim 6, wherein the stepped portion is formed at an angle along an outer edge thereof so that the outer edge of the steel plate is stepped in a height direction with respect to a central portion of the steel plate.

9. The method of claim 6, wherein the steel panel is a surface-treated steel plate, and the fiber reinforced plastic panel is manufactured using carbon fiber.

10. A method of manufacturing a composite vehicle body panel, the method comprising:
manufacturing a steel panel;
forming foaming portions and a stepped portion on the steel panel by pressing;
forming a steel flange with one or more fastening holes and one or more through holes by punching the steel panel;
manufacturing a foamed plastic in a shape that can be inserted into the foaming portions;
inserting and bonding the foamed plastic into the foaming portions; and
spraying and hardening discontinuous fiber and resin on the steel flange,
wherein the foaming portions are formed as receiving grooves in the steel flange at edges of the steel flange and extend across the steel flange in a width direction,
each of the one or more through-holes has a foaming portion along the edge thereof, and
the steel flange includes at least one separation wall in which the one more fastening holes are formed, the at least one separation wall formed of steel, extending across the whole width of the steel flange, and disposed between the one or more through-holes.

* * * * *